(12) United States Patent
Roth et al.

(10) Patent No.: US 8,461,272 B2
(45) Date of Patent: Jun. 11, 2013

(54) AZO COMPOUNDS FOR POLYPROPYLENE DEGRADATION

(75) Inventors: Michael Roth, Lautertal (DE); Rudolf Pfaendner, Rimbach (DE); Carl-Eric Magnus Wilén, Esbo (FI); Ronan Nicolas, Abo (FI)

(73) Assignee: BASF SE, Ludwigshafen (DE)

( * ) Notice: Subject to any disclaimer, the term of this patent is extended or adjusted under 35 U.S.C. 154(b) by 233 days.

(21) Appl. No.: 11/887,498

(22) PCT Filed: Mar. 29, 2006

(86) PCT No.: PCT/EP2006/061120
§ 371 (c)(1),
(2), (4) Date: Apr. 9, 2008

(87) PCT Pub. No.: WO2006/106059
PCT Pub. Date: Oct. 12, 2006

(65) Prior Publication Data
US 2009/0105425 A1    Apr. 23, 2009

(30) Foreign Application Priority Data
Apr. 6, 2005  (EP) .................................. 05102701

(51) Int. Cl.
*C08C 19/08* (2006.01)
*C08F 6/04* (2006.01)
(52) U.S. Cl.
USPC ................. 525/333.7; 525/331.7; 525/374; 525/376; 534/588

(58) Field of Classification Search
USPC ........................... 525/331.7, 333.7, 374, 376
See application file for complete search history.

(56) References Cited

U.S. PATENT DOCUMENTS

| | | | | |
|---|---|---|---|---|
| 4,007,165 | A | * | 2/1977 | MacLeay et al. ............. 534/838 |
| 4,552,930 | A | * | 11/1985 | Hirota et al. ................ 525/333.8 |
| 5,883,167 | A | | 3/1999 | Medinger et al. |
| 6,620,892 | B1 | | 9/2003 | Bertin et al. |
| 2007/0029531 | A1 | | 2/2007 | Ronan et al. |

FOREIGN PATENT DOCUMENTS

| | | |
|---|---|---|
| DE | 1299880 | 7/1969 |
| DE | 3105830 | 9/1982 |
| WO | 2005/030852 | * 4/2005 |

OTHER PUBLICATIONS

Derwent Abst. 1982-76834E and Chem. Abst. 97:183073 for DE 3105830 Sep. 1982.
Derwent Abst. 1968-80307p and Chem. Abst. 71:71169 for DE 1299880 Jul. 1969.
Onishi et al., Polymer, vol. 23, Apr. 1982, pp. 630-631.

* cited by examiner

*Primary Examiner* — Robert C Boyle
(74) *Attorney, Agent, or Firm* — Tyler A. Stevenson

(57) ABSTRACT

The invention relates to a process and compositions suitable for reducing by heat the molecular weight of polypropylene, propylene copolymers or polypropylene blends. Azo compounds bearing different substituents are added to the polymers.

5 Claims, No Drawings

AZO COMPOUNDS FOR POLYPROPYLENE DEGRADATION

The invention relates to a process and compositions suitable for lowering the molecular weight of polypropylene, propylene copolymers or polypropylene blends.

The controlled preparation of polyolefin grades (polymer types having different molar masses, melt viscosities, densities, molar mass distributions, etc.) by customary compounding methods, for example by extrusion or injection moulding, is a routine process employed by polymer manufacturers and polymer processors/compounders.

The setting of the desired parameters, for example the melt viscosity, by means of this polymer process step is critically dependent on the controlled reactivity and mode of action of the additives employed.

The use of free-radical formers for modifying the melt viscosity (rheology) of polyolefins is a generally known method. Whether it results in a lowering of the molecular weight (degradation) or an increase in the molecular weight (cross linking) depends primarily on the chemical structure of the polyolefin.

The reaction of a polymer of the polypropylene type with a free-radical former during a polymer-processing process generally results in the degradation of the polymer, whereas polymers of the polyethylene type tend to cross-link. Examples that may be mentioned here are polyethylene types, which are obtainable by means of Phillips catalysts (LDPE) or metallocene catalysts (LLDPE). Exceptions are the polyethylene types prepared by the Ziegler process, which likewise tend to undergo chain degradation when processed in the presence of free-radical formers.

In the case of copolymers and terpolymers or copolymer blends, high proportions of propylene produce polypropylene-like behaviour, while high proportions of ethylene result in polyethylene-like behaviour. If the above-mentioned copolymers and terpolymers or copolymer blends comprise proportions of multiply unsaturated olefins, the probability of cross linking decreases with decreasing concentration of free double bonds.

The controlled degradation of polypropylene (PP) to give a product having a lower molecular weight and a narrower molecular weight distribution is a commercially important process for producing 'controlled rheology' polypropylene (CR-PP). While specific PP grades ("reactor grades") are obtainable by optimisation of the synthesis process or the catalyst systems (metallocene catalyst, Ziegler catalyst), standard PP grades are frequently modified in process technology by means of a processing step following the synthesis.

Known degradation processes proceed either thermally, in particular at temperatures above 280° C., or in the presence of free-radical generators. In process technology, the free-radical induced process is carried out in extruders or injection-moulding machines at temperatures above 180° C. Free-radical generators used are organic peroxides, which are added during the processing step in diluted form (PP Mastermix, diluted in oil, stabilized on inorganic supports) or directly as a liquid. Under the given processing conditions, the peroxide disintegrates into free radicals, which initiate the chain cleavage reactions and form polymers having the desired rheological properties (melt viscosities). The degradation of a PP to form a product having a lower molecular weight (higher melt flow rate (MFR)) is generally referred to as a viscosity-breaking or vis-breaking process.

CR-PP grades are mainly used for fibre applications and injection-moulding applications in which low melt viscosities are a prerequisite for economical processing. A wide range of melt viscosities or molecular weights is nowadays required in process technology.

A further parameter that influences the processing behaviour of the polymer, in addition to the molecular weight, is the molecular weight distribution (MWD). While polymer grades having broad MWDs display improved orientation behaviour of the polymer chains at low pull-off speeds in a fibre spinning process, the reverse is the case for high pull off speeds and broad MWDs. For this reason, narrow MWDs are essential at high pull-off speeds in order to achieve improved continuity in the spinning process.

The use of peroxides is a drawback, since only a restricted "processing temperature window" is available because of their decomposition temperatures, which are generally below the customary temperatures of polymer processing. In addition, strict safety regulations have to be adhered to during storage, handling and processing of peroxides. A further disadvantage of peroxides is the impossibility of decomposition-free melt compounding with polymers.

Apart from peroxides, other sources of free radicals are also known, e.g. C-radical generators based on cumyl systems, but these can be used only at temperatures above 280° C. WO 97/49737 describes a process for reducing the molecular weight of polymers at temperatures above 280° C. using so-called NOR-HALS (HALS: Hindered Amino Light Stabilisers) compounds containing the group:

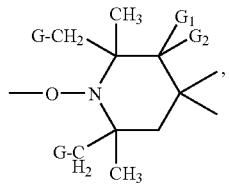

Wherein G is hydrogen or methyl and $G_1$ and $G_2$ are each hydrogen, methyl or are together oxo. These known NOR-HALS compounds produce appreciable polymer degradation only at temperatures above 280° C. Since most polymers are processed below this temperature at 160-280° C., there is a particular need for compounds, which can be used at correspondingly lower temperatures.

WO 01/90113 discloses a process for reducing the molecular weight of polypropylene, propylene copolymers or polypropylene blends, wherein a hydroxylamine ester of the formula:

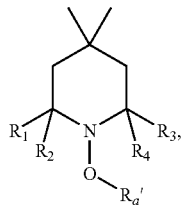

Wherein among others $R_a'$ is a monoacyl radical and $R_1$-$R_4$ are alkyl-substituents; is added to the polypropylene polymers to be degraded, and the mixture is heated to temperatures below 280° C.

The present invention relates to the problem of improving that prior art process further by obtaining polymers of a more homogeneous (narrow) molecular weight distribution and a reduced level of oligomeric and volatile decomposition products.

It has surprisingly been found that azo compounds of bearing different substituents are useful for reducing the molecular weight of polypropylene, propylene copolymers or polypropylene blends.

Subject matter of the present invention is a process for reducing the molecular weight of polypropylene, propylene copolymers or polypropylene blends, wherein at least one azo compound of the formula $$A-N=N-B \qquad (I),$$

is added, wherein A and B represent carbocyclic $C_6$-$C_{10}$aryl groups of different structure, or represent the groups $$R_1R_2R_3-C \qquad (a)\ or$$

$$C-R_1'R_2''R_3''' \qquad (b)$$

of different structure, wherein
one of $R_1$, $R_2$ and $R_3$ represents hydrogen and two of $R_1$, $R_2$ and $R_3$ represent $C_1$-$C_{35}$hydrocarbon radicals; or
two of $R_1$, $R_2$ and $R_3$ represent hydrogen and one of $R_1$, $R_2$ and $R_3$ represents a $C_1$-$C_{35}$hydrocarbon radical; or
$R_1$, $R_2$ and $R_3$ each represent $C_1$-$C_{35}$hydrocarbon radicals; and
one of $R_1'$, $R_2''$ and $R_3'''$ represents hydrogen and two of $R_1'$, $R_2''$ and $R_3'''$ represent $C_1$-$C_{35}$hydrocarbon radical; or
two of $R_1'$, $R_2''$ and $R_3'''$ represent hydrogen and one of $R_1'$, $R_2''$ and $R_3'''$ represents $C_1$-$C_{35}$hydrocarbon radical; or
$R_1'$, $R_2''$ and $R_3'''$ represent $C_1$-$C_{35}$hydrocarbon radical;
is added to the polypropylene, propylene copolymers or polypropylene blend to be degraded and the mixture is heated. claim 1

The compounds (I) are known or can be prepared by known methods.

The present invention also relates to the use of the azo compounds (I) as defined above for reducing the molecular weight of polypropylene, propylene copolymers or polypropylene blends. claim 8

A highly preferred embodiment relates to a process, wherein at least one azo compound of the formula $$R_1R_2R_3-C-N=N-C-R_1'R_2''R_3''' \qquad (II)$$

is added, wherein the groups (a) and (b) are of different structure, and
one of $R_1$, $R_2$ and $R_3$ represents hydrogen and two of $R_1$, $R_2$ and $R_3$ or
two of $R_1$, $R_2$ and $R_3$ represent hydrogen and one of $R_1$, $R_2$ and $R_3$ or
$R_1$, $R_2$ and $R_3$ each represent $C_1$-$C_{20}$alkyl, $C_2$-$C_{20}$alkenyl, $C_1$-$C_{20}$alkyl or $C_2$-$C_{20}$alkenyl interrupted by at least one heteroatom selected from the group consisting of O, S and N. $C_2$-$C_{20}$alkinyl, $C_5$-$C_{20}$aryl, $C_1$-$C_{12}$alkyl-$C_5$-$C_{20}$aryl, $C_5$-$C_{20}$aryl-$C_1$-$C_4$alkyl, mono- or bicyclic $C_5$-$C_{20}$cycloalkyl, mono- or bicyclic $C_1$-$C_{12}$alkyl-$C_5$-$C_{20}$cycloalkyl, mono- or bicyclic $C_5$-$C_{20}$cycloalkyl-$C_1$-$C_4$alkyl; or
represent bivalent $C_1$-$C_{20}$alkylene, $C_2$-$C_{20}$alkenylene, $C_1$-$C_{20}$alkylene or $C_2$-$C_{20}$alkenylene interrupted by at least one heteroatom selected from the group consisting of O, S and N, $C_2$-$C_{20}$alkinylene, $C_5$-$C_{20}$arylene, $C_1$-$C_{12}$alkyl-$C_5$-$C_{20}$arylene, $C_5$-$C_{20}$aryl-$C_1$-$C_4$alkylene, mono- or bicyclic $C_5$-$C_{20}$cycloalkylene, mono- or bicyclic $C_1$-$C_{12}$alkyl-$C_5$-$C_{20}$cyclolalkylene, or mono- or bicyclic $C_5$-$C_{20}$cycloalkyl-$C_1$-$C_4$alkylene, which are substituted by the group $$R_1R_2R_3-C-N=N- \qquad (c),$$

Wherein independently of one another $R_1$, $R_2$ and $R_3$ represent hydrogen or a $C_1$-$C_{35}$hydrocarbon radical; or
two of $R_1$, $R_2$ and $R_3$ together with the carbon atom form mono- or bicyclic $C_5$-$C_{20}$cycloalkyl or mono- or bicyclic $C_1$-$C_{12}$alkyl-$C_5$-$C_{20}$cycloalkyl and one of $R_1$, $R_2$ and $R_3$ represents a $C_1$-$C_{35}$hydrocarbon radical; or
$R_1$, $R_2$ and $R_3$ together with the carbon atom form $C_5$-$C_{20}$aryl or $C_1$-$C_{12}$alkyl-$C_5$-$C_{20}$aryl, and
$R_1'$, $R_2''$ and $R_3'''$ are as defined as $R_1$, $R_2$ and $R_3$. Claim 2

A particularly preferred embodiment relates to a process, wherein at least one azo compound of the formula (II) is added, wherein the groups (a) and (b) are of different structure, and
one of $R_1$, $R_2$ and $R_3$ represents hydrogen and two of $R_1$, $R_2$ and $R_3$ represent $C_1$-$C_{20}$alkyl, $C_5$-$C_{20}$cycloalkyl or $C_5$-$C_{20}$cycloalkyl-$C_1$-$C_4$alkyl; or
two of $R_1$, $R_2$ and $R_3$ represent hydrogen and one of $R_1$, $R_2$ and $R_3$ represents $C_1$-$C_{20}$alkyl, $C_5$-$C_{20}$cycloalkyl or $C_5$-$C_{20}$cycloalkyl-$C_1$-$C_4$alkyl; or
$R_1$, $R_2$ and $R_3$ each represent $C_1$-$C_{20}$alkyl, $C_5$-$C_{20}$cycloalkyl or $C_5$-$C_{20}$cycloalkyl-$C_1$-$C_4$alkyl; or
two of $R_1$, $R_2$ and $R_3$ together with the carbon atom form $C_5$-$C_8$cycloalkyl and one of $R_1$, $R_2$ and $R_3$ represents hydrogen or $C_1$-$C_4$alkyl; or
$R_1$, $R_2$ and $R_3$ together with the carbon atom form $C_5$-$C_{10}$aryl; and
$R_1'$, $R_2''$ and $R_3'''$ are as defined as $R_1$, $R_2$ and $R_3$. claim 3

A most preferred embodiment relates to a process, wherein at least one azo compound of the formula (II) is added, wherein the groups (a) and (b) are of different structure, and
one of $R_1$, $R_2$ and $R_3$ represents hydrogen and two of $R_1$, $R_2$ and $R_3$ represent $C_6$-$C_{20}$alkyl or $C_5$-$C_8$cycloalkyl; or
two of $R_1$, $R_2$ and $R_3$ represent hydrogen and one of $R_1$, $R_2$ and $R_3$ represents $C_6$-$C_{20}$alkyl or $C_5$-$C_8$cycloalkyl; or
$R_1$, $R_2$ and $R_3$ each represent $C_1$-$C_{20}$alkyl or $C_5$-$C_8$cycloalkyl; or
two of $R_1$, $R_2$ and $R_3$ together with the carbon atom form $C_5$-$C_8$cycloalkyl and one of $R_1$, $R_2$ and $R_3$ represents hydrogen or $C_1$-$C_4$alkyl; or
$R_1$, $R_2$ and $R_3$ together with the carbon atom form $C_5$-$C_{10}$aryl; and
$R_1'$, $R_2''$ and $R_3'''$ are as defined as $R_1$, $R_2$ and $R_3$. claim 4

The terms and expressions used in the description of the invention preferably have the following meanings:

$C_1$-$C_{20}$hydrocarbon radicals $R_1$, $R_2$ and $R_3$ and, correspondingly, $R_1'$, $R_2''$ and $R_3'''$, are preferably $C_1$-$C_{20}$alkyl, e.g. methyl, ethyl or straight chained or branched $C_3$-$C_{30}$alkyl, e.g. n-propyl, isopropyl, n-, iso- or tert-butyl, n-pentyl, isoamyl, neopentyl, 2-ethylbutyl, n-hexyl, 1-methylpentyl, 1,3-dimethylbutyl, n-heptyl, isoheptyl, n-octyl, 1,4,4-trimethyl2-pentyl, 3,4-, 3,5- or 4,5-dimethyl-1-hexyl, 3- or 5-methyl-1-heptyl, 1,1,3,3-tetramethylbutyl, 2-ethylhexyl, branched octyl as obtained from a dimer of isobutylene, n-nonyl, 1,1,3-trimethylhexyl, branched nonyl as obtained from a trimer of tripropylene, 1-methylundecyl, 2-n-butyl-n-octyl, branched dodecyl obtained from a trimer of isobutylene or a tetramer of propylene, branched pentadecyl obtained from a pentamer of propylene, 2-n-hexyl-n-decyl or 2-n-octyl-n-dodecyl.

$C_3$-$C_{20}$Hydrocarbon radicals $R_1$, $R_2$ and $R_3$ are preferably $C_3$-$C_{20}$alkyl, $C_5$-$C_{12}$cycloalkyl, $C_5$-$C_{12}$cycloalkyl-$C_1$-$C_4$alkyl, phenyl, $C_7$-$C_{20}$alkylphenyl, $C_7$-$C_{20}$alkoxyphenyl, naphthyl and $C_7$-$C_9$phenylalkyl.

Other definitions that apply with regard to the above-mentioned $C_1$-$C_{20}$hydrocarbon radicals $R_1$, $R_2$ and $R_3$ and, correspondingly, $R_1'$, $R_2''$ and $R_3'''$, such as $C_3$-$C_{20}$alkyl, are e.g. n-nonyl, 1,1,3-trimethylhexyl, n-decyl, n-undecyl, n-dodecyl, 1-methylundecyl, n-tridecyl, n-tetradecyl, n-pentadecyl, n-hexadecyl, n-heptadecyl and n-octadecyl. An especially preferred radical for $R_1$, $R_2$ and $R_3$ is isopropyl.

$C_5$-$C_{12}$Cycloalkyl is, e.g., cyclopentyl or cyclohexyl. $C_5$-$C_{12}$Cycloalkyl-$C_1$-$C_4$alkyl is, e.g. cyclopentylmethyl, 2-cyclopentylethyl, cyclohexylmethyl or 2-cyclohexylethyl.

$C_7$-$C_{20}$Alkylphenyl is phenyl that is substituted, for example, by from one to three of the $C_1$-$C_4$alkyl radicals described above or by one or two $C_1$-$C_6$alkyl radicals or one $C_1$-$C_{12}$alkyl radical.

$C_7$-$C_{20}$Alkoxyphenyl is phenyl that is substituted, for example, by from one to three $C_1$-$C_4$-alkoxy radicals, especially methoxy or ethoxy, or by one or two $C_1$-$C_6$alkoxy radicals or one $C_1$-$C_{12}$alkoxy radical, those radicals being analogous to the alkyl radicals mentioned hereinabove.

$C_7$-$C_9$Phenylalkyl is, e.g. benzyl, 1-phenyl-1-ethyl or 2-phenyl-1-ethyl.

The polypropylene-type polymers to be degraded can encompass propylene homopolymers, propylene copolymers (EPR) and polypropylene blends. Propylene copolymers may contain various proportions up to 90%, preferably up to 50%, of comonomers. Examples of comonomers are: olefins such as 1-olefins, e.g. ethylene, 1-butene, 1-pentene, 1-hexene, 1-heptene or 1-octene, isobutylene, cycloolefins, e.g. cyclopentene, cyclohexene, norbornene or ethylidenenorborne, dienes such as butadiene, isoprene, 1,4-hexadiene, cyclopentadiene, dicyclopentadiene or norbornadiene; also acrylic acid derivatives and unsaturated carboxylic anhydrides such as maleic anhydride.

According to a preferred embodiment the azo compound is added to a propylene homopolymer, propylene copolymers (EPR) or blends of polypropylene with polyethylene selected from the group consisting of high density polyethylene (HDPE), high molecular weight high density polyethylene (HMW HDPE), ultra high molecular weight high density polyethylene (UHMW HDPE), medium density polyethylene (MDPE), low density polyethylene (LDPE), linear low density polyethylene (LLDPE), branched low density polyethylene (BLDPE) and ethylene-propylene-diene terpolymers (EPDM) containing small proportions of diene. Claim 7.

Another embodiment relates to a polymer composition comprising
A) At least one azo compound of the formula

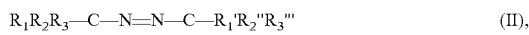 (II),

Wherein the groups (a) and (b) are of different structure, and
one of $R_1$, $R_2$ and $R_3$ represents hydrogen and two of $R_1$, $R_2$ and $R_3$ represent $C_1$-$C_{20}$alkyl, $C_5$-$C_{20}$cycloalkyl or $C_5$-$C_{20}$cycloalkyl-$C_1$-$C_4$alkyl; or
two of $R_1$, $R_2$ and $R_3$ represent hydrogen and one of $R_1$, $R_2$ and $R_3$ represents $C_1$-$C_{20}$alkyl, $C_5$-$C_{20}$cycloalkyl or $C_5$-$C_{20}$cycloalkyl-$C_1$-$C_4$alkyl; or
$R_1$, $R_2$ and $R_3$ each represent $C_1$-$C_{20}$alkyl, $C_5$-$C_{20}$cycloalkyl or $C_5$-$C_{20}$cycloalkyl-$C_1$-$C_4$alkyl; or
two of $R_1$, $R_2$ and $R_3$ together with the carbon atom form $C_5$-$C_8$cycloalkyl and one of $R_1$, $R_2$ and $R_3$ represents hydrogen or $C_1$-$C_4$alkyl; or
$R_1$, $R_2$ and $R_3$ together with the carbon atom form $C_5$-$C_{10}$aryl; and
$R_1'$, $R_2''$ and $R_3'''$ are as defined as $R_1$, $R_2$ and $R_3$, with the proviso that the compound (II), wherein one of $R_1$, $R_2$ and $R_3$ represents hydrogen and two of $R_1$, $R_2$ and $R_3$ represent cyclohexyl and two of $R_1'$, $R_2''$ and $R_3'''$ represent hydrogen and one of $R_1$, $R_2$ and $R_3$ represents $C_{15}$alkyl is excluded; and
B) Polypropylene, propylene copolymers or polypropylene blends. Claim 7

A particularly preferred embodiment relates to a polymer composition comprising
A) At least one azo compound of the formula (II),
Wherein the groups (a) and (b) are of different structure, and
one of $R_1$, $R_2$ and $R_3$ represents hydrogen and two of $R_1$, $R_2$ and $R_3$ represent $C_6$-$C_{20}$alkyl or $C_5$-$C_8$cycloalkyl; or
two of $R_1$, $R_2$ and $R_3$ represent hydrogen and one of $R_1$, $R_2$ and $R_3$ represents $C_6$-$C_{20}$alkyl or $C_5$-$C_8$cycloalkyl;
and one of $R_1'$, $R_2''$ and $R_3'''$ represents hydrogen and two of $R_1$, $R_2$ and $R_3$ represent $C_6$-$C_{20}$alkyl or $C_5$-$C_8$cycloalkyl of different structure; or
two of $R_1'$, $R_2''$ and $R_3'''$ represent hydrogen and one of $R_1$, $R_2$ and $R_3$ represents $C_6$-$C_{20}$alkyl or $C_5$-$C_8$cycloalkyl of different structure;
two of $R_1$, $R_2$ and $R_3$ together with the carbon atom form $C_5$-$C_8$cycloalkyl and one of $R_1$, $R_2$ and $R_3$ represents hydrogen or $C_1$-$C_4$alkyl with the proviso that the compound (II), wherein one of $R_1$, $R_2$ and $R_3$ represents hydrogen and two of $R_1$, $R_2$ and $R_3$ represent cyclohexyl and two of $R_1'$, $R_2''$ and $R_3'''$ represent hydrogen and one of $R_1$, $R_2$ and $R_3$ represents $C_{15}$alkyl is excluded; and
B) Polypropylene, Propylene Copolymers or Polypropylene Blends. Claim 8

The addition to the polypropylene, propylene copolymers or polypropylene blend can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing. Particularly preferred processing machines are single-screw extruders, contra rotating and co rotating twin-screw extruders, planetary-gear extruders, ring extruders or co-kneaders. It is also possible to use processing machines provided with at least one gas removal compartment to which a vacuum can be applied.

Suitable extruders and kneaders are described, for example, in *Handbuch der Kunststoffextrusion, Vol.* 1 *Grundlagen*, Editors F. Hensen, W Knappe, H. Potente, 1989, pp. 3-7, *ISBN:*3-446-14339-4 (*Vol.* 2 *Extrusionsanlagen* 1986, *ISBN* 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The polymers may need to be subjected to an elevated temperature for a sufficient period of time, so that the desired degradation occurs. The temperature is generally above the softening point of the polymers.

In a preferred embodiment of the process of the present invention, a temperature range from about 160° C. to 340° C. claim 6 is employed. In a particularly preferred process variant, the temperature range from about 200° C. to 270° C. is employed.

The period of time necessary for degradation can vary as a function of the temperature, the amount of material to be degraded and the type of, for example, extruder used. It is usually from about 10 seconds to 20 minutes, in particular from 20 seconds to 10 minutes.

In the process for reducing the molecular weight (degradation process) of the polypropylene polymers, the above-described compositions comprising the azo compounds (I) are present in concentrations, based on the amount of polymers to be degraded, of from about 0.001 to 5.0% by weight, in particular from 0.01 to 2.0% by weight and particularly preferably from 0.02 to 1.0% by weight.

Incorporation into the polymers can be carried out, for example, by mixing the above-described azo compounds (I) and, if desired, further additives into the polymers using the methods customary in process technology.

Incorporation can, alternatively, also be carried out at temperatures, which do not yet cause decomposition of the polymers (latent compound). The polymers prepared in this way can subsequently be heated a second time and subjected to an elevated temperature for a sufficient period of time so that the desired polymer degradation occurs.

The azo compounds (I) can also be added to the polymers to be degraded in the form of a master batch, in which these compounds are present, for example, in a concentration of from about 1.0-25.0% by weight. The master batch (concentrate) can be produced at temperatures, which do not yet cause decomposition of the compounds of the present invention.

This provides a product, which is defined by specific dosage amounts and may be compounded with other additives. The master batch can then be compounded with the polymer to be degraded at a temperature above the decomposition temperature of the azo compounds (I).

The present invention therefore further provides a concentrate in which the azo compounds (I) are present in a concentration of 1.0-25.0% by weight and which can be added to the polymer to be degraded. The desired product is thus obtainable in an advantageous two-stage process.

In a specific embodiment, suitable additives, such as metal salts, e.g. of Ca, Fe, Zn or Cu, are added to the polymers to be degraded.

It has surprisingly been found that oxides, hydroxides and carbonates of metals in the oxidation state II aid the degrading action. Preference is therefore given to compositions which, in addition to the above-described azo compounds (I), further comprise 0.1-10 parts of metal salt per part of azo compound (I). Particular preference is given to concentrations of 0.5-10 parts of metal salt selected from the group consisting of CaO, $CaCO_3$, ZnO, $ZnCO_3$, MgO, $MgCO_3$ or $Mg(OH)_2$ per part of the mixture.

Apart from the azo compounds (I), further additives can also be present in the polymer, e.g. sulphur based pigments like ultramarine blue, light stabilizers of the 2-(2-hydroxyphenyl)-1,3,5-triazine type which are known from the patent literature, e.g. U.S. Pat. No. 4,619,956, EP-A-434 608, U.S. Pat. No. 5,198,498, U.S. Pat. No. 5,322,868, U.S. Pat. No. 5,369,140, U.S. Pat. No. 5,298,067, WO-94/18278, EP-A-704 437, GB-A-2,297,091 or WO-96/28431. Further examples of additives are listed in WO 01/90113.

In a specific embodiment of the invention, the polymer to be degraded is prepared with addition of the above-described azo compounds (I) together with selected antioxidants and processing stabilizers or mixtures of these. Examples of preferred compounds are:

Pentaerythrityl tetrakis(3-(3,5-di-tert-butyl-4-hydroxyphenyl)propionate) (Irganox® 1010), octadecyl 3-(3,5-di-tert-butyl-4-hydroxyphenyl)propionate) (IRGANOX 1076), 3,3',3',5,5',5'-hexa-tert-butyl-α,α',α'-(mesitylene-2,4,6-triyl) tri-p-cresol (IRGANOX 1330), calcium diethyl bis(((3,5-bis (1,1-dimethylethyl)-4-hydroxyphenyl)methyl)phosphonate) (IRGANOX 1425), 1,3,5-tris(3,5-di-tert-butyl-4-hydroxybenzyl)-1,3,5-triazine-2,4,6(1H,3H,5H)trione (IRGANOX 3114);

Tris(2,4-di-tert-butylphenyl) phosphite (Irgafos® 168), tris(nonylphenyl) phosphite, tetra-kis(2,4-di-tert-butylphenyl) [1,1-biphenyl]-4,4'-diylbisphosphonite (IRGANOX P-EPQ), didodecyl 3,3'-thiodipropionate (IRGANOX PS 800), dioctadecyl 3,3'-thiodipropionate (IRGANOX PS 802); 5,7-di-tert-butyl-3-(3,4-dimethylphenyl)-3H-benzofuran-2-one (IRGANOX HP 136) and distearylhydroxylamine (Irgastab® FS 042).

Further additives are antacids, such as calcium stearate or zinc stearate, hydrotalcites or calcium lactate, calcium lactylate from Patco (Pationic®).

In a specific embodiment, further sources of free radicals, e.g. a suitable bis azo compound, peroxide or a hydroperoxide, in addition to the azo compounds can be added to the polymers to be degraded.

Suitable bis azo compounds are commercially available, e.g. 2,2'-azobisisobutyronitrile, 2,2'-azobis(2-methylbutyronitrile), 2,2'-azobis(2,4-dimethylvaleronitrile), 2,2'-azobis (4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis (hydroxymethyl)ethyl]propionamide} or 2,2'-azobis{2-methyl-N-[1,1-bis(hydroxymethyl)-2-hydroxyethyl]propionamide}.

Suitable peroxides and hydroperoxides are commercially available, e.g. acetylcyclohexane-sulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl) peroxide, diisononanoyl peroxide, didecanoyl peroxide, dioctanoyl peroxide, dilauroyl peroxide, bis(2-methylbenzoyl) peroxide, disuccinoyl peroxide, diacetyl peroxide, dibenzoyl peroxide, tert-butyl per-2-ethylhexanoate, bis(4-chlorobenzoyl) peroxide, tert-butyl perisobutyrate, tert-butyl permaleate, 1,1-bis(tert-butylperoxy)-3,5,5-trimethylcyclohexane, 1,1-bis(tert-butylperoxy)cyclohexane, tert-butyl peroxyisopropyl carbonate, tert-butyl perisononanoate, 2,5-di-methylhexane 2,5-dibenzoate, tert-butyl peracetate, tert-amyl perbenzoate, tert-butyl perbenzoate, 2,2-bis(tert-butylperoxy)butane, 2,2-bis (tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl) benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

The abovementioned bis azo compounds, peroxides or hydroperoxides are added to the polymers to be degraded in amounts smaller than those customary when they are used alone in the processes of the prior art.

In a further preferred embodiment of the present invention, at least 2 different free-radical initiators having different decomposition temperatures are employed, so that the degradation of the polymers may occur in 2 stages. This process is also referred to as sequential degradation.

Suitable compositions comprise, for example, the azo compounds (I) and the abovementioned peroxides or a combination of the NOR-compounds described in WO 97/49737.

It is essential that the two decomposition temperatures are sufficiently apart for effecting to a 2-stage process. For example, a peroxide having a decomposition temperature in the range of about 180-220° C. can be combined with the azo compounds (I) having decomposition temperatures in the range of about 240-340° C.

It is of course also possible to use mixtures of free-radical generators having different decomposition temperatures in the process.

According to a preferred embodiment the degradation is advantageously carried out in the presence of small amounts of free nitroxyl radicals. A more readily controllable degradation of the polymer is achieved, which leads to more constant melting properties. Suitable nitroxyl radicals are known and described in U.S. Pat. No. 4,581,429 or EP-A-621 878. Open-chain structures are described in WO 99/03894 and WO 00/07981. Furthermore, NO-derivatives of the piperidine type are described in WO 99/67298 and in British Patent Specification 2,335,190. Other NO-derivatives of heterocyclic compounds are described in British Patent Specification 2,342,649.

The following examples illustrate the invention:

A) SYNTHETIC EXAMPLE

Cyclohexyl-(1,1,3,3-Tetramethyl-Butyl)-Diazene

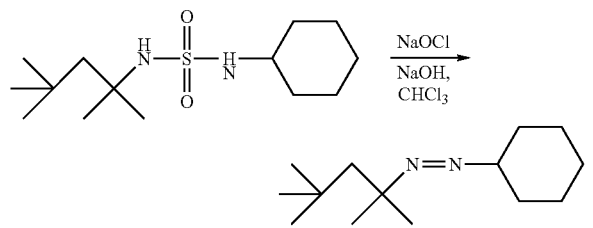

A solution of 10% aqueous NaOCl (416 g, 0.56 mol) and NaOH (22.80 g, 0.57 mol) is added at 0 C to a solution of N-cyclohexyl-N'-tert-octylsulfamide (41.41 g, 0.14 mol) in CHCl₃ (50 ml). The mixture is stirred at 0 C for 20 min on an ice bath, diluted with CHCl₃ (20 ml) and stirred for additional 19 h at room temperature. The solution is diluted with water (200 ml) and CHCl₃ (200 ml). After phase separation the aqueous layer is extracted with CHCl₃ (50 ml×4) and the combined organic phases are washed with water (50 ml×5) and 1 M NaHSO₃ (50 ml×6), dried (Na₂SO₄), filtered, concentrated and dried in vacuum to give a brownish oily liquid. The residue is purified by flash chromatography (silica gel; ethyl acetate) to yield cyclohexyl-(1,1,3,3-tetramethyl-butyl)-diazene as a yellow oil (yield: 27.9 g, 89%).

$^1$H NMR (CDCl$_3$, 600 MHz, δ): 3.31 (quintet, 1H, cyclohexyl-CH), 1.83-1.79 (m, 4H, tert-octyl, cyclohexyl), 1.66-1.63 (m, 6H, cyclohexyl), 1.34-1.26 (m, 2H, cyclohexyl), 1.12 (s, 6H, tert-octyl), 0.87 (s, 9H, tert-octyl); $^{13}$C NMR (CDCl$_3$, δ): 75.8, 70.3, 53.4, 31.84, 31.76, 30.3, 27.0, 25.7, 24.3; mass spectroscopy m/z 209 (224-Me), 153, 113, 83.

B) APPLICATION EXAMPLE

Unless stated otherwise, commercial polypropylene (Moplen® HF 500N, manufacturer: Basell) is extruded on a twin-screw extruder ZSK 25 from Werner & Pfleiderer at a temperature of T$_{max}$ 230° C. (heating zones 1-6), a throughput of 4 and 100 rpm with addition of basic-level stabilization (0.3% Irganox® B225+0.05% calcium stearate) and the additives indicated in the Table, granulated in a water bath. The melt viscosity (MFR) is determined in accordance with ISO 1133. The polymer density for MFR measurements is 0.75. A large increase in the melt flow rate indicates substantial chain degradation.

Under the processing conditions indicated, the addition of an azo compound results in the PP used undergoing increased degradation, which is reflected in higher MFR values as compared with the Control Example. Unless stated otherwise, the additives are made up of the test compound and in each case 0.1% of IRGANOX B 225 and 0.05% of calcium stearate. IRGANOX B 225 is a 1:1 mixture of Irgafos®168 and IRGANOX 1010.

TABLE

| Example | Additives | | MFR (230/2.16)* |
|---|---|---|---|
| Control | 0.1% of IRGANOX B 225<br>0.05% of calcium stearate | | 14 |
| Example 1 | 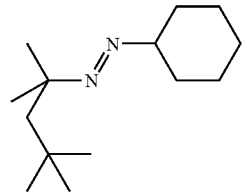<br>0.25% | | 220 |
| Example 2 | 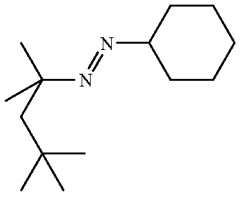<br>0.5% | | 430 |
| Example 3 | 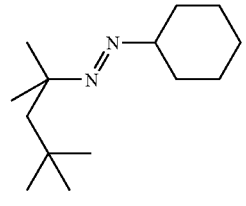<br>0.75% | | 800** |

*According to ISO1133
**Measured with a smaller die (1.05 mm diameter); resulting MFR values are back-calculated via correlation to standard conditions.

The invention claimed is:

1. A process for reducing the molecular weight of polypropylene, propylene copolymers or polypropylene blends, wherein at least one azo compound of formula (II)

$$R_1R_2R_3\text{—}C\text{—}N{=}N\text{—}C\text{—}R_1'R_2''R_3''' \qquad (II)$$

is added to the polypropylene, propylene copolymers or polypropylene blend to be degraded and the mixture is heated to a temperature of between 160 and 340° C.,
wherein
two of $R_1$, $R_2$ and $R_3$ together with the carbon atom form a $C_5$-$C_8$cycloalkyl and one of $R_1$, $R_2$ and $R_3$ is hydrogen and
$R_1'$, $R_2''$ and $R_3'''$ are each $C_1$-$C_{20}$alkyl.

2. A process according to claim 1, wherein two of $R_1$, $R_2$ and $R_3$ together with the carbon atom form cyclohexyl and one of $R_1$, $R_2$ and $R_3$ is hydrogen and $R_1'$, $R_2''$ and $R_3'''$ are each $C_1$-$C_{20}$alkyl.

3. A process according to claim 1, wherein that at least one azo compound (II) is added to a blend of polypropylene with polyethylene selected from the group consisting of high density polyethylene (HDPE), high molecular weight high density polyethylene (HMW HDPE), ultra high molecular weight high density polyethylene (UHMW HDPE), medium density polyethylene (MDPE), low density polyethylene (LDPE), linear low density polyethylene (LLDPE), branched low density polyethylene (BLDPE) and ethylene-propylene-diene terpolymers (EPDM) containing small proportions of diene.

4. A process according to claim 1, where at least one azo compound is

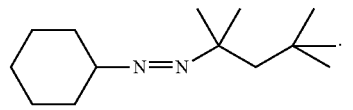

5. A process according to claim 4, wherein that at least one azo compound (II) is added to a blend of polypropylene with polyethylene selected from the group consisting of high density polyethylene (HDPE), high molecular weight high density polyethylene (HMW HDPE), ultra high molecular weight high density polyethylene (UHMW HDPE), medium density polyethylene (MDPE), low density polyethylene (LDPE), linear low density polyethylene (LLDPE), branched low density polyethylene (BLDPE) and ethylene-propylene-diene terpolymers (EPDM) containing small proportions of diene.

* * * * *